United States Patent [19]
Liao

[11] Patent Number: 5,421,434
[45] Date of Patent: Jun. 6, 1995

[54] WHEEL ASSEMBLY HAVING CLUTCH AND BRAKE MECHANISM

[75] Inventor: Gordon Liao, Taipei, Taiwan, Prov. of China

[73] Assignee: Unique Product & Design Co., Ltd., Yung Kang, Taiwan, Prov. of China

[21] Appl. No.: 245,931

[22] Filed: May 19, 1994

[51] Int. Cl.⁶ .............................................. B60T 1/06
[52] U.S. Cl. ................................ 188/1.12; 188/31; 188/69
[58] Field of Search .............. 188/1.12, 69, 68, 6, 188/31, 19, 20, 21, 22, 16; 16/35 R

[56] References Cited

U.S. PATENT DOCUMENTS

| | | | |
|---|---|---|---|
| 865,002 | 9/1907 | Viola | 188/31 |
| 1,190,811 | 7/1916 | Swoyer et al. | 188/31 |
| 1,863,349 | 6/1932 | Noelting et al. | 188/69 |
| 3,356,185 | 12/1967 | Isaacks | 188/31 |
| 4,527,680 | 7/1985 | Sato | 188/69 |
| 4,997,066 | 3/1991 | Bigo | 188/69 |

Primary Examiner—Matthew C. Graham
Attorney, Agent, or Firm—Pro-Techtor International

[57] ABSTRACT

A wheel includes a hub having a number of teeth formed on one end. A cam is rotatably supported on one end of the hub. An axle is rotatably engaged in the hub and has one end engaged with the cam. A spring biases the axle to engage with the cam. A coupler is rotatably engaged on the axle and includes a key for engaging with the teeth of the hub when the spring biases the axle toward the cam, and the key is disengaged from the teeth when the axle is moved against the spring by the cam. The wheel can be applied to push carts or applied to motor vehicles.

4 Claims, 11 Drawing Sheets

WHEEL ASSEMBLY HAVING CLUTCH AND BRAKE MECHANISM

BACKGROUND OF THE INVENTION

1. Field of the Invention

The present invention relates to a wheel assembly, and more particularly to a wheel assembly having clutch and brake mechanism.

2. Description of the Prior Art

Typical push cars or hand carts comprise a number of wheels disposed in the bottom portion. Most of the push cars have no brake mechanisms provided therein. Typical golf cars comprise wheels that have no clutch means disposed therein, such that the golf car can not be easily moved when the Bole car is out of order.

The present invention has arisen to mitigate and/or obviate the afore-described disadvantages of the conventional wheels.

SUMMARY OF THE INVENTION

The primary objective of the present invention is to provide a wheel assembly which includes a clutch mechanism and a brake mechanism provided therein.

In accordance with one aspect of the invention, there is provided a wheel assembly comprising a wheel body including a hub provided therein, the hub including a first end and a second end, a first engaging means provided in the second end of the hub; a cam rotatably coupled to the wheel body at the first end of the hub; an axle rotatably engaged in the hub and including a first end engaged with the cam and a second end extended outward of the hub; means for biasing the axle toward the cam; coupler means rotatably engaged on the second end of the axle and movable in concert with the axle, the coupler means including a second engaging means; the axle being biased toward the cam by the biasing means so as to engage the second engaging means with the first engaging means, and second engaging means being disengaged from the first engaging means when the axle is moved against the biasing means by the cam.

The first engaging means includes a plurality of teeth formed on the second end of the hub, the second engaging means includes a key formed on the coupler means for engaging with the teeth of the hub.

The first engaging means includes a plurality of first teeth formed on the second end of the hub, the coupler means includes a gearing having an output shaft, the second engaging means includes a catch secured on the shaft, the catch includes a plurality of second teeth formed thereon for engaging with the first teeth of the hub.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
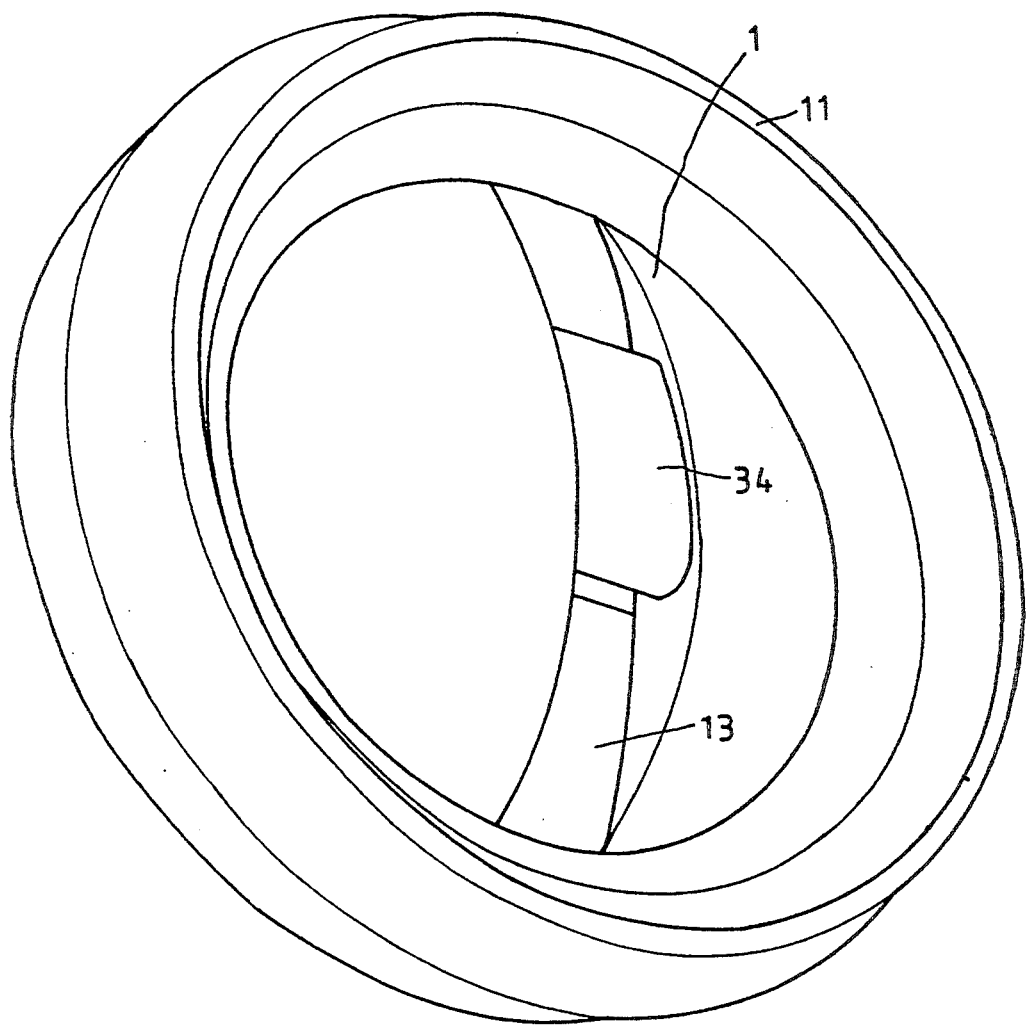
FIG. 1 is a front perspective view of a wheel assembly in accordance with the present invention, in which the wheel assembly is engaged in a hand car or a push cart.

Referring to the drawings, and initially to FIGS. 1 to 4, a wheel assembly in accordance with the present invention comprises a wheel body 1 including a tire 11 disposed on the outer peripheral portion thereof, and including a hub 12 provided therein. The wheel body 1 includes an outer surface having a depression 13 formed therein, and an inner surface having a number of spokes provided therein. The hub 12 includes an annular shoulder 14 formed therein (FIG. 4), and includes an inner end having a number of teeth 16 formed thereon. The hub 12 also includes two grooves 15 formed therein.

Two bearings 24, 25 are disposed in the hub 12, a barrel 26 is disposed in the hub 12 and engaged between the bearings 24, 25. A spring 27 is engaged on the barrel 26 and biased between the annular shoulder 14 and the bearing 25. An axle 20 is rotatably engaged in the barrel 26 with the bearings 24, 25 and includes an outer thread 21 formed on one end for engaging with a nut 28 so as to fix the bearing 25 to the axle 20. A cap 29 is engaged with the bearing 25 for covering the nut 28. The other end of the axle 20 includes an annular groove 22 formed therein and two projections 23 formed thereon. A coupler 4 for coupling the wheel to the push car includes a hole 42 formed therein for engaging with the end portion of the axle 20. A retaining ring 43 is engaged with the annular groove 22 of the axle 20 so as to secure the axle 20 to time coupler 4. The coupler 4 includes a key 44 for engaging with the teeth 16 of the hub 12.

A handle 34 is engaged in the depression 13 of the wheel body 1 and includes a cam portion 31 formed thereon. The cam portion 31 is rotatably coupled to the wheel body by spring 33 and pins 32 which are engaged in the grooves 15 of the wheel body 1. The spring 27 biases the bearing 25 and the cap 29 to engage with the cam portion 31, best shown in FIG. 4.

Figure 4:
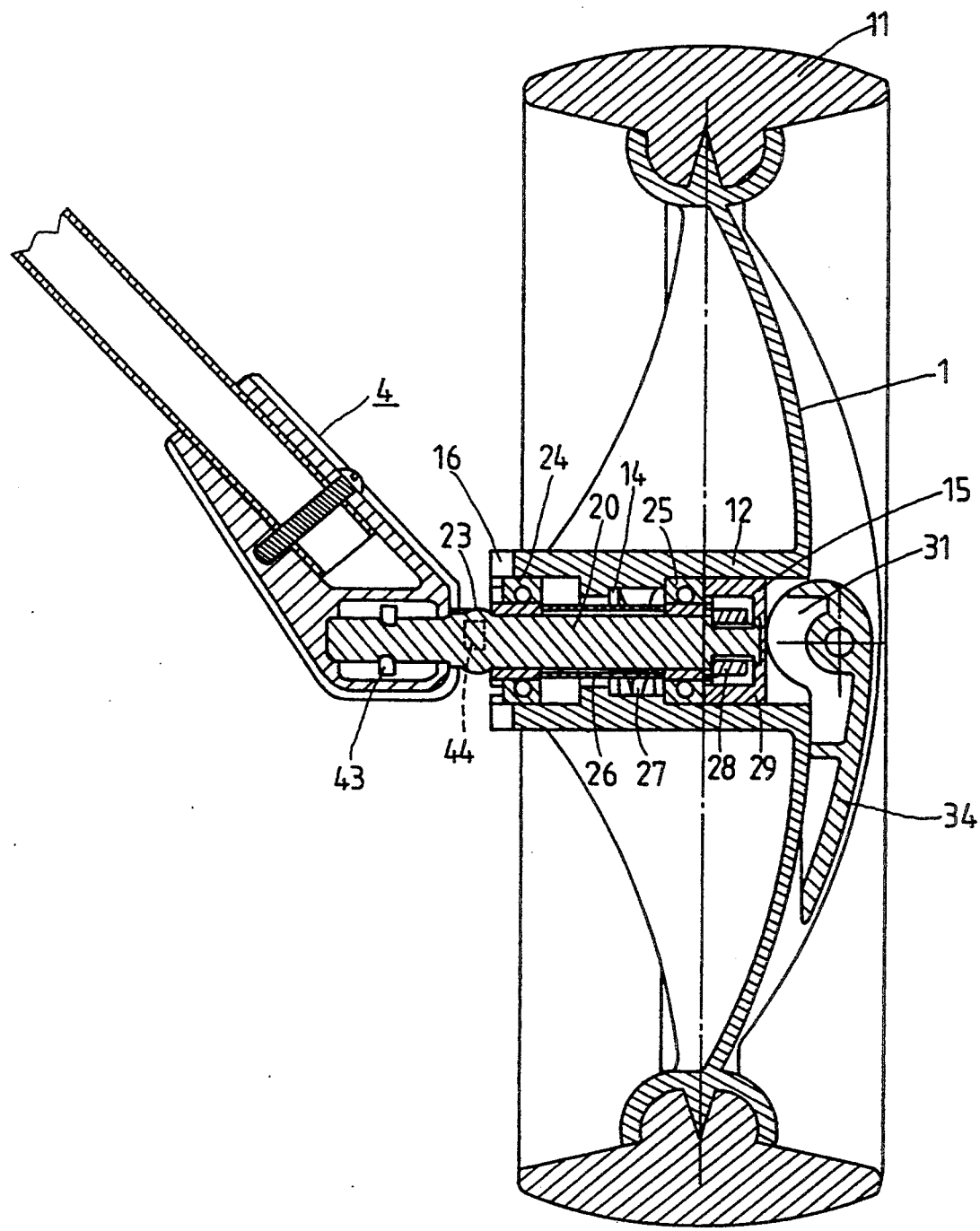
FIGS. 4 and 5 are cross sectional views taken along lines 4—4 of FIG. 1.
Figure 5:
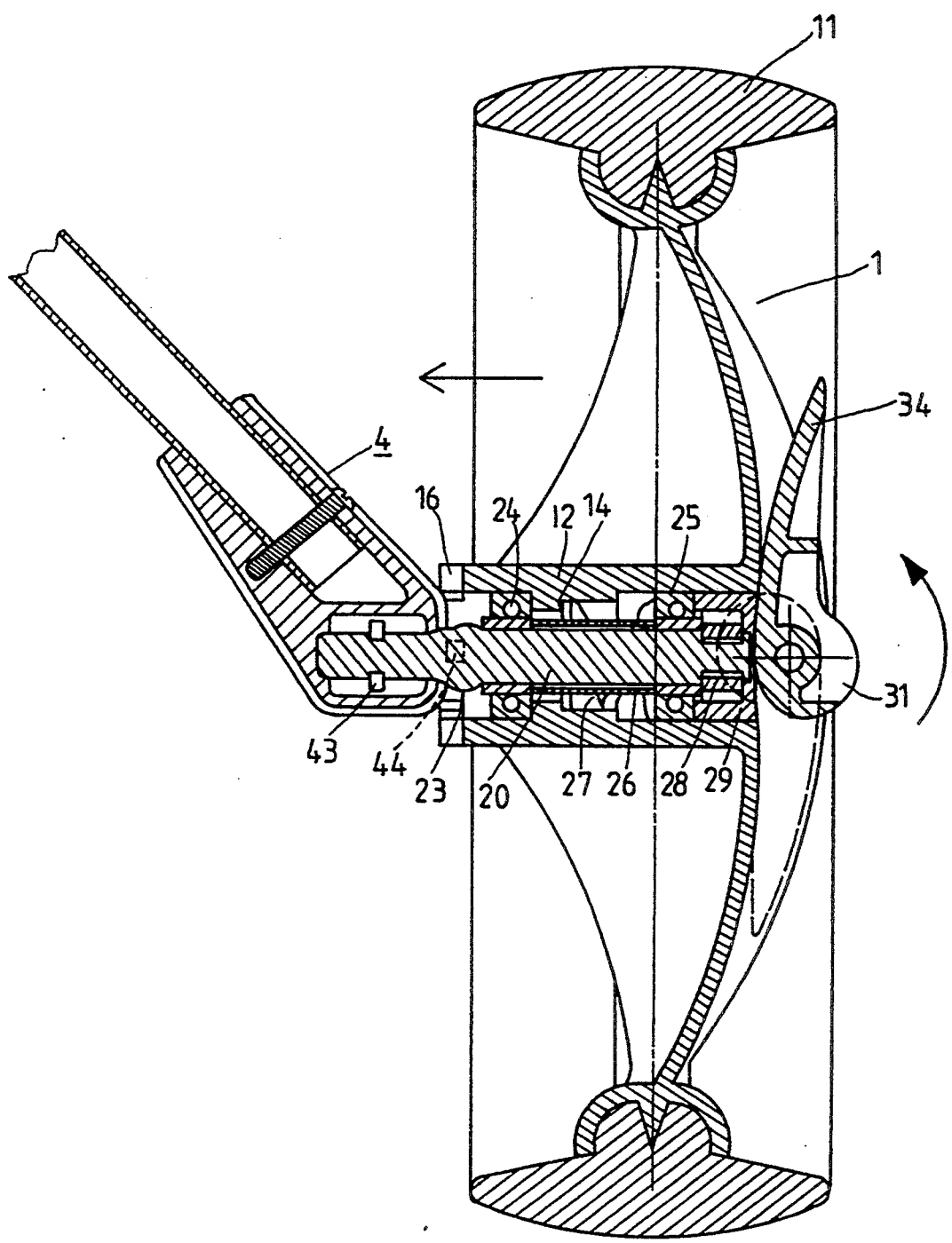

In operation, as shown in FIG. 4, when the handle 34 is rotated downward, the cam portion 31 pushes the axle 20 away from the cam portion 31 against the spring 27, such that the key 44 is disengaged from the teeth 16 of the hub 12. At this moment, the wheel may rotate freely. When it is required to brake the wheel, as shown in FIG. 5, it is only required to actuate the handle 34 upward, the axle 20 may be forced toward the cam portion 31 by the spring 27, such that the key 44 may be engaged with the teeth 16 of the hub 12 in order to brake the wheel.

Figure 6:
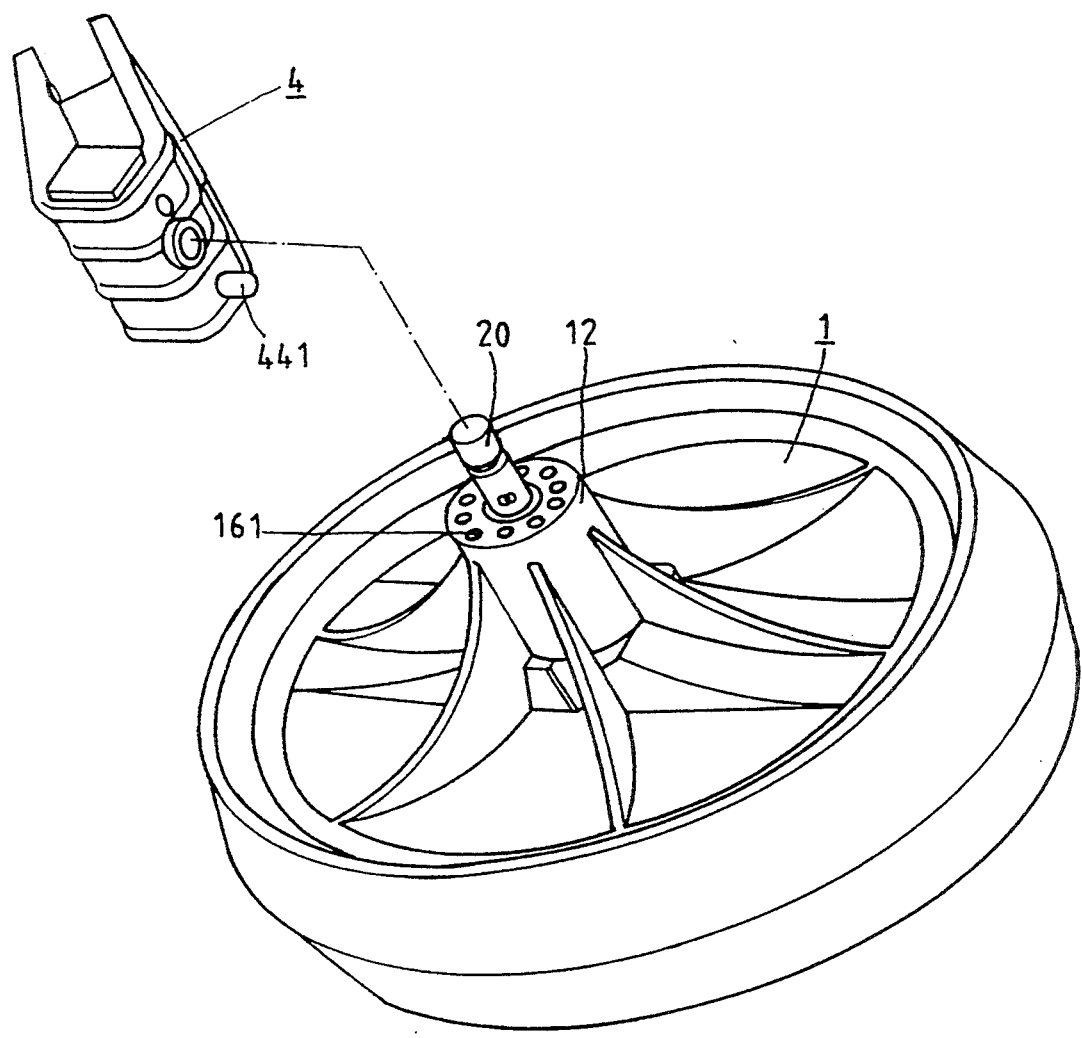
FIG. 6 is a partial exploded view illustrating another type of the brake mechanism.
Figure 7:
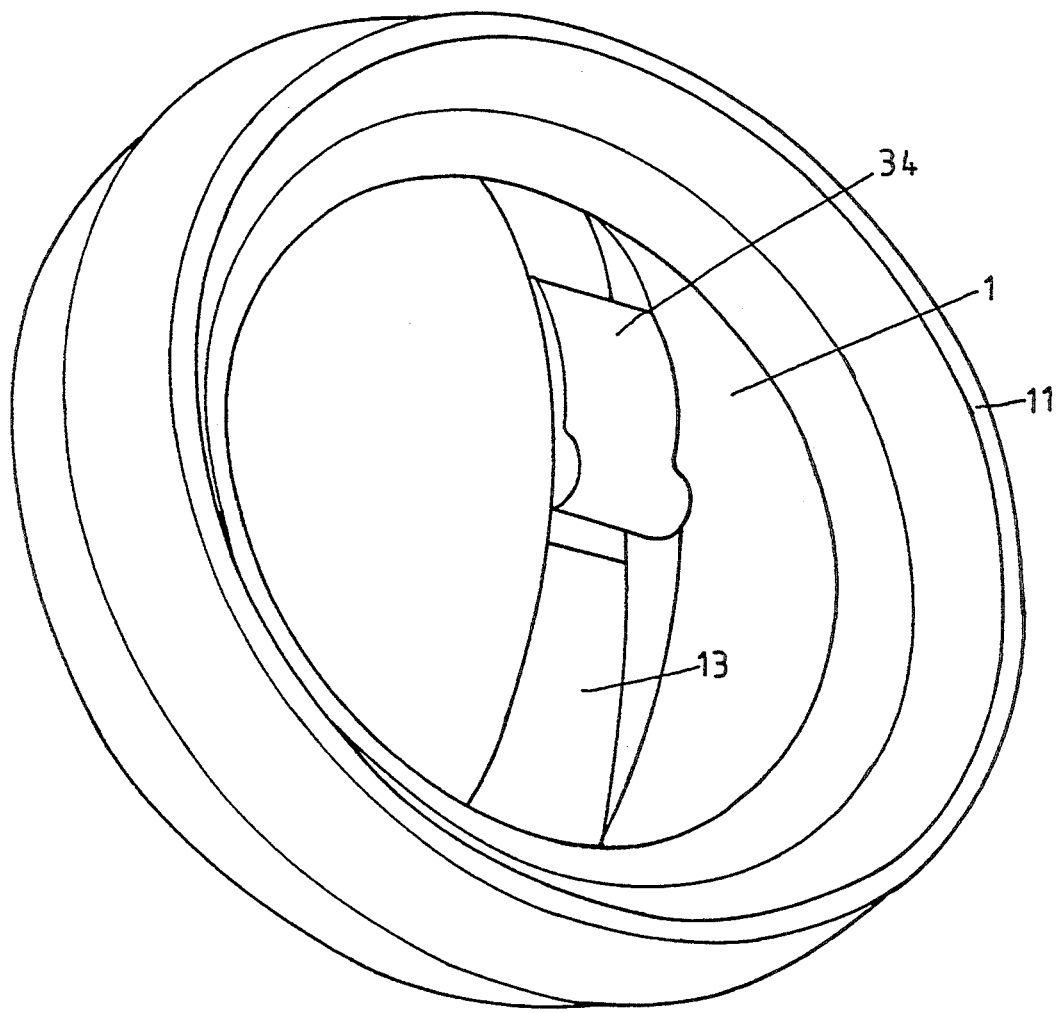
FIG. 7 is a front perspective view of a wheel assembly in accordance with the present invention, in which the wheel assembly is engaged in a motor vehicle.
Figure 8:
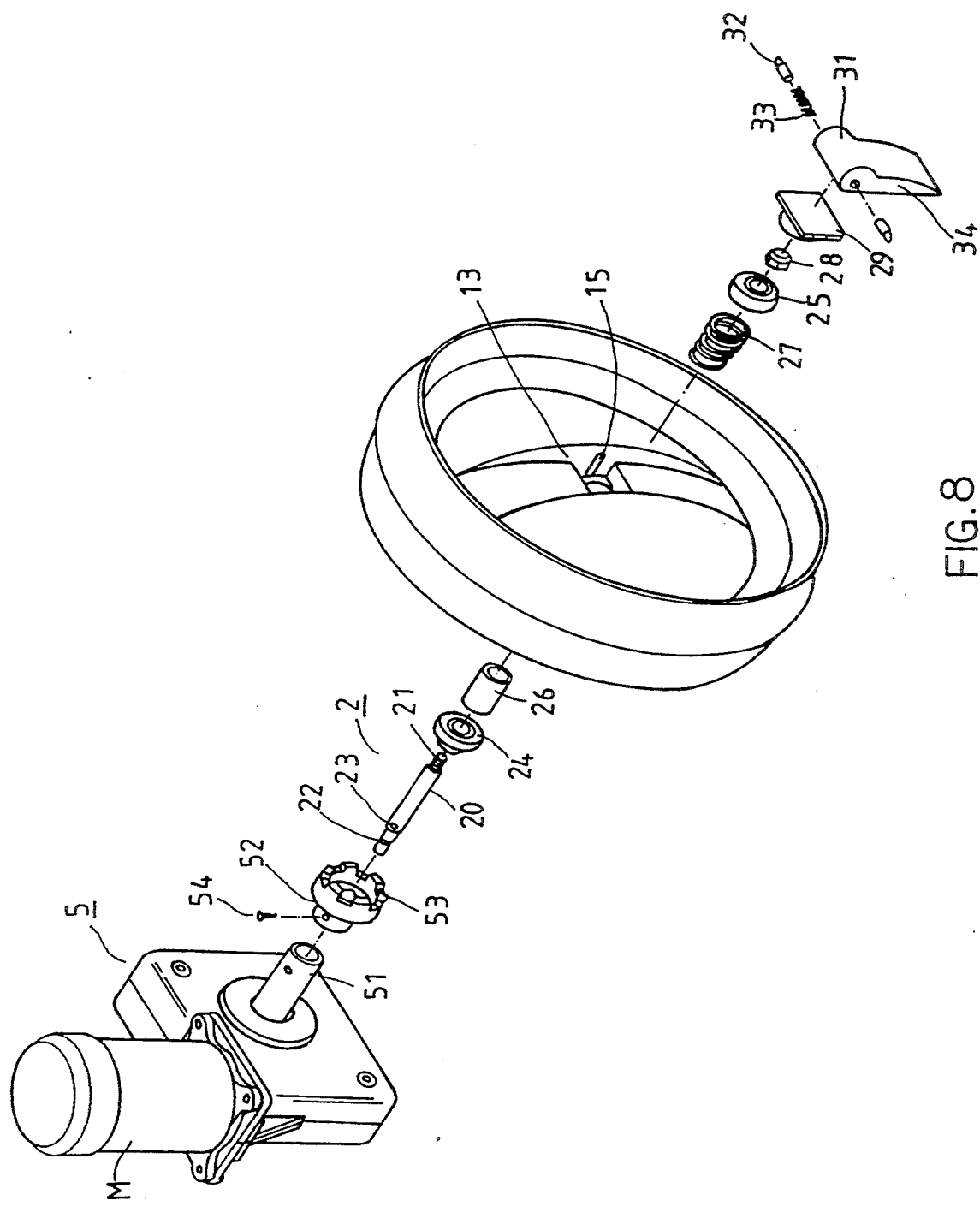
FIG. 8 is an exploded view of the wheel assembly as shown in FIG. 7.

Referring next to FIG. 6, the hub 12 may includes a number of apertures 161 formed therein for engaging with the key 441 of the coupler 4.

Figure 2:
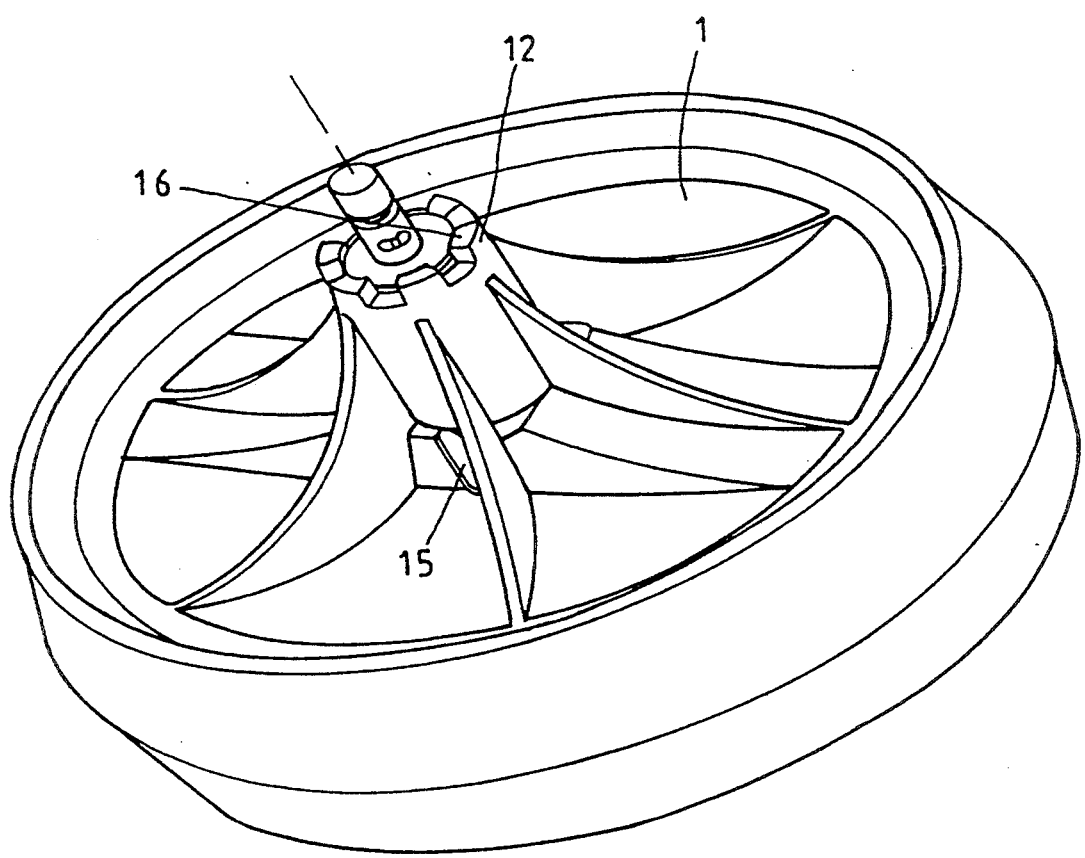
FIG. 2 is a rear perspective view of the wheel assembly.
Figure 3:
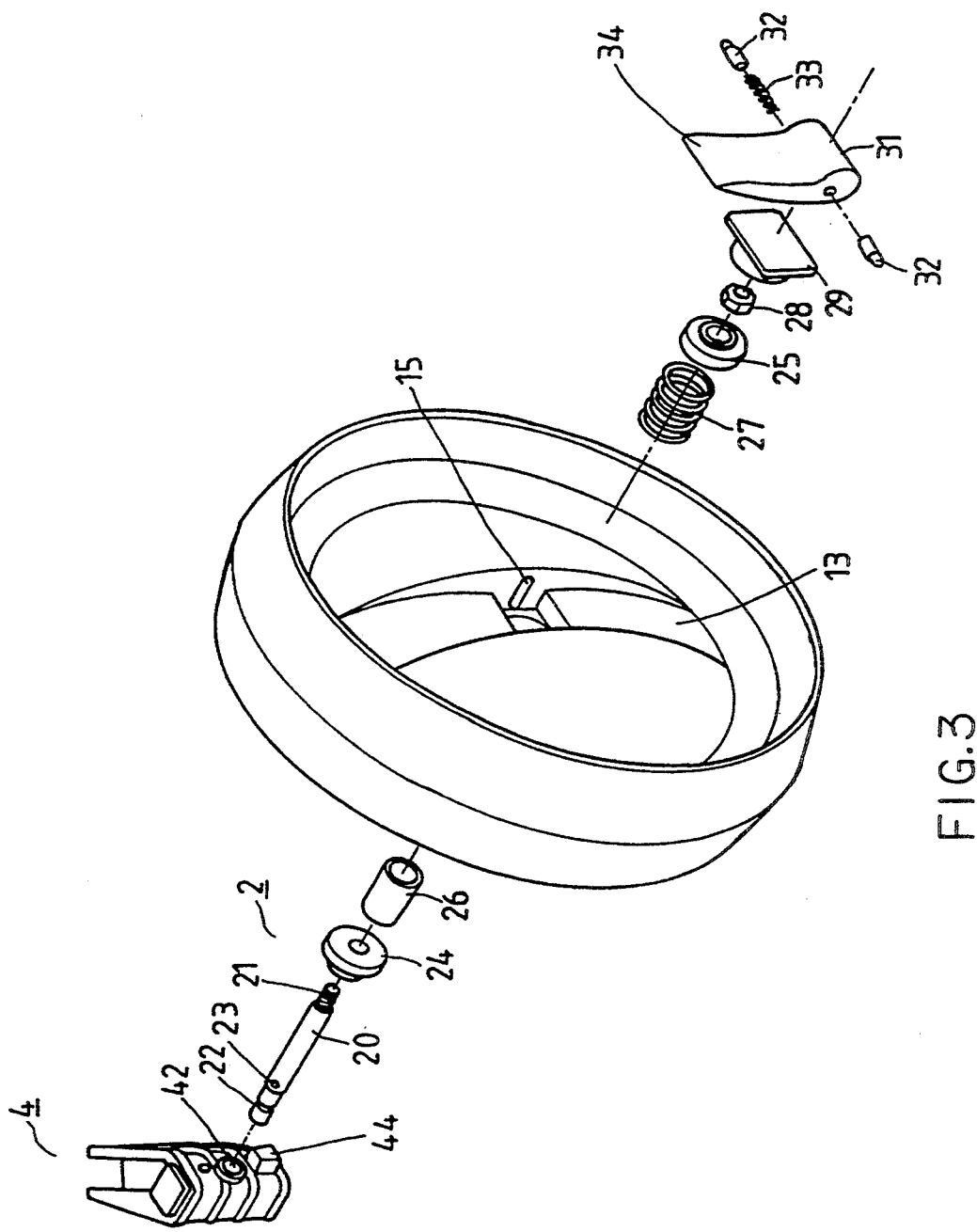
FIG. 3 is an exploded view of the wheel assembly.
Figure 9:
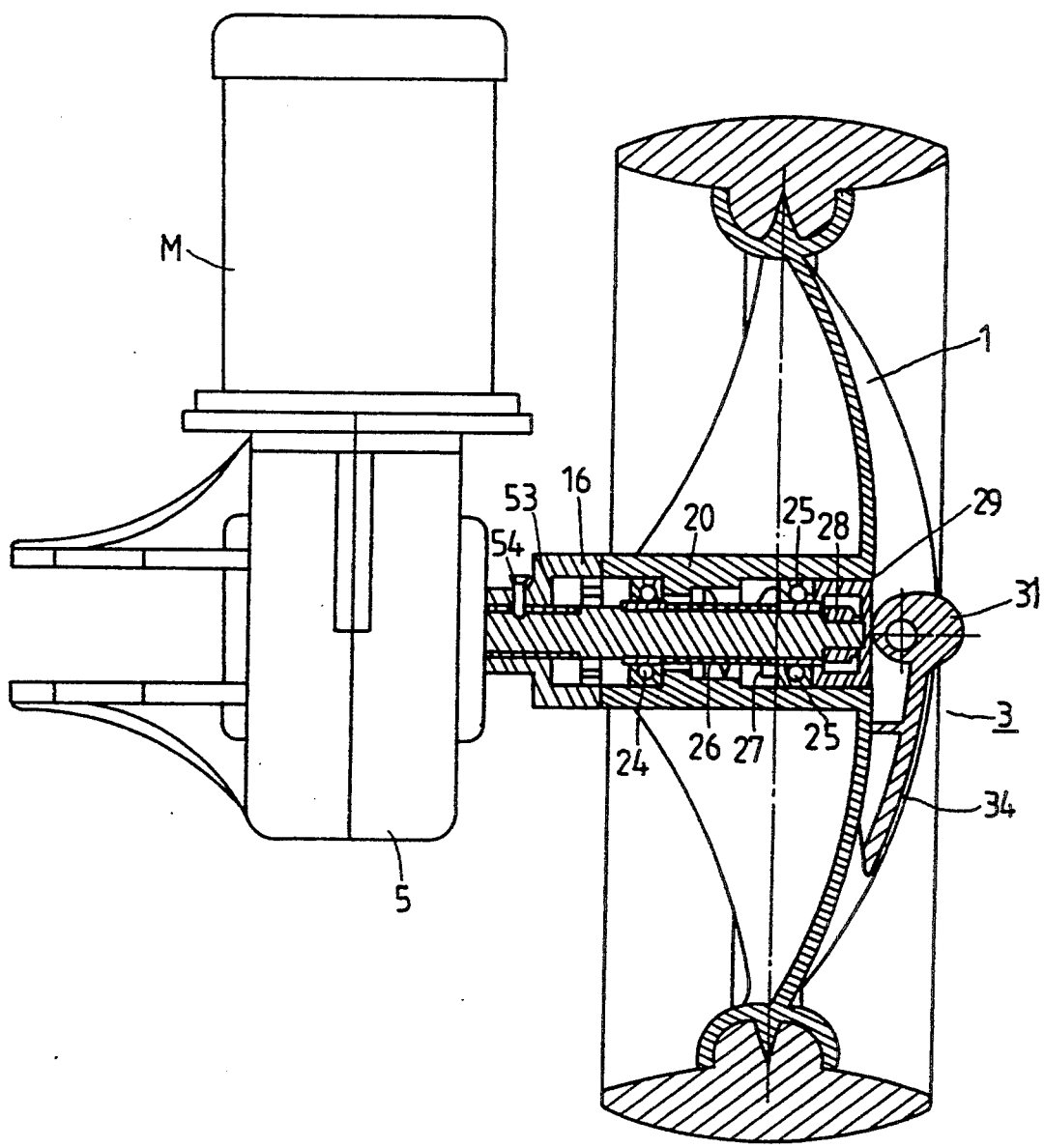
FIGS. 9 and 10 are cross sectional views taken along lines 9—9 of FIG. 7.
Figure 10:
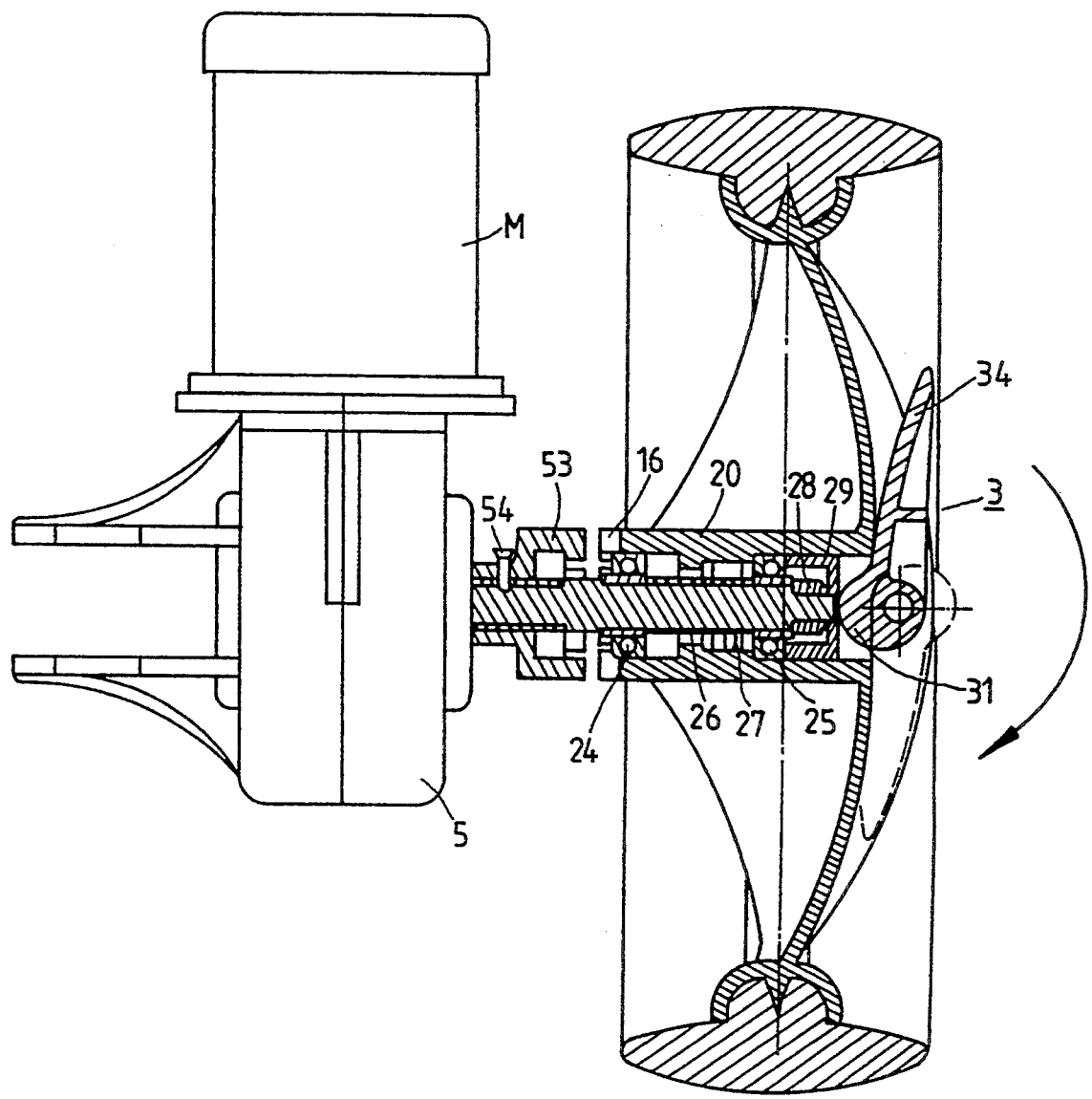

Referring next to FIGS. 7 to 10, and again to FIG. 2, illustrating the application of the wheel assembly to a motor vehicle. A coupler or a gearing 5 which is driven by a motor M connects the wheel assembly to the motor vehicle. The gearing 5 includes an output shaft 51 for receiving the end portion of the axle 20. A catch 52 is fixed to the shaft 51 by a pin element 54 and includes a number of teeth 53 formed thereon for engaging with the teeth 16 of the hub 12, the pin element 54 is engaged with the annular groove 22 such that the axle 20 is rotatably coupled to the shaft 51 and axially movable in concert with the shaft Referring next to FIG. 9, the teeth 53 is engaged with the teeth 16 of the hub 12 such that the wheel can be rotated by the motor M via the shaft 51 of the gearing 5. However, as shown in FIG. 10, the teeth 53 are disengaged from the teeth 16 when the cam portion 31 is rotated against the spring 27. At this moment, the wheel may freely rotate relative to the gearing 5.

Figure 11:
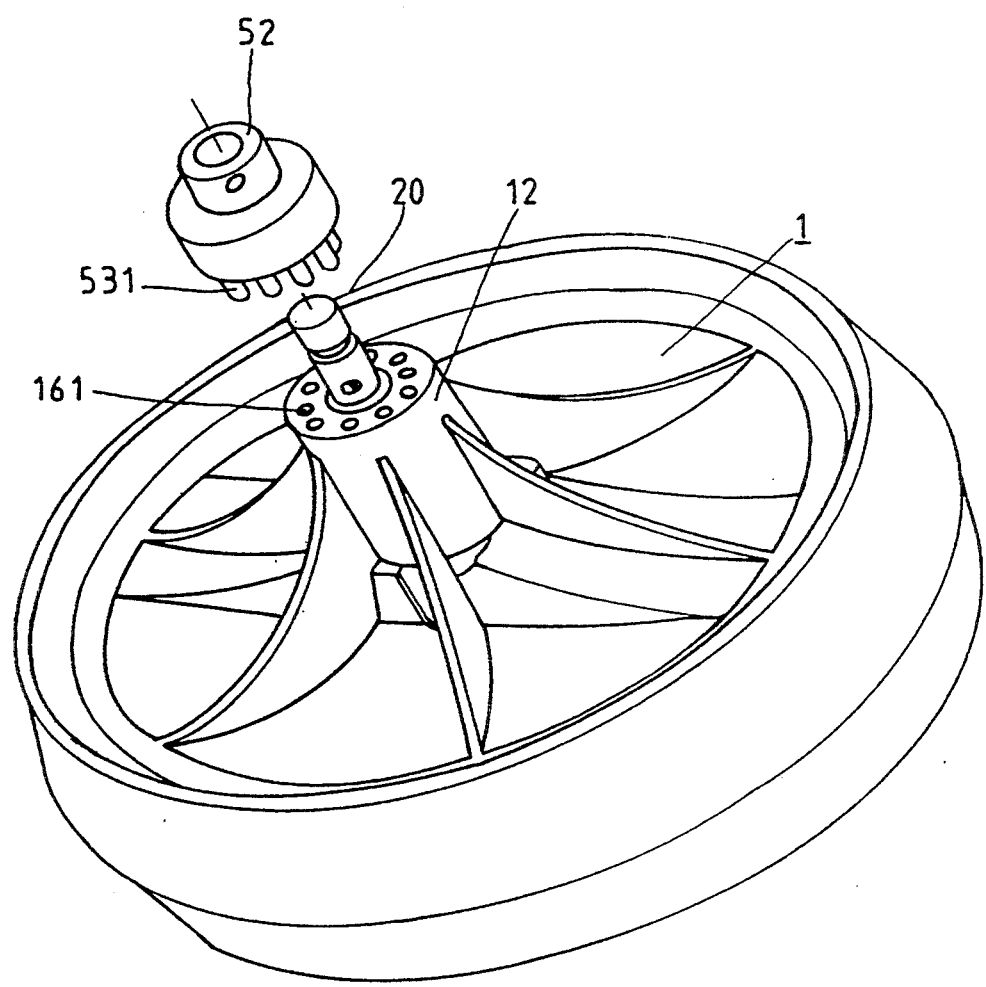
FIG. 11 is a partial exploded view illustrating anther type of the brake mechanism.

Referring next to FIG. 11, the hub 12 may includes a number of apertures 161 formed therein for engaging with the stubs 531 of the catch 52.

Accordingly, the wheel assembly in accordance with the present invention includes a mechanism that can be used as a brake mechanism when the wheel assembly is engaged in a push cart, and the mechanism can be used as a clutch mechanism when the wheel assembly is engaged in a motor vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheel assembly comprising:
    a wheel body including a hub provided therein, said hub including a first end and a second end, a first engaging means provided in said second end of said hub;
    a cam rotatably coupled to said wheel body at said first end of said hub;
    an axle rotatably engaged in said hub and including a first end engaged with said cam and a second end extended outward of said hub;
    means for biasing said axle toward said cam;
    coupler means rotatably engaged on said second end of said axle and movable in concert with said axle, said coupler means connected to a second engaging means;
    said axle being biased toward said cam by said biasing means so as to engage said second engaging means with said first engaging means, and second engaging means being disengaged from said first engaging means when said axle is moved against said biasing means by said cam.

2. A wheel assembly according to claim 1, wherein said hub includes bearing means engaged between said hub and said axle, a cap engaged with said first end of said axle and engaged with said cam, said biasing means biases said cap to engage with said cam.

3. A wheel assembly according to claim 1, wherein said first engaging means includes a plurality of teeth formed on said second end of said hub, said second engaging means of said coupler means includes a key formed on said coupler means for engaging with said teeth of said hub.

4. A wheel assembly according to claim 1, wherein said first engaging means includes a plurality of first teeth formed on said second end of said hub, said coupler means includes a gearing having an output shaft, said second engaging means includes a catch secured on said shaft, said catch includes a plurality of second teeth formed thereon for engaging with said first teeth of said hub.

* * * * *